(12) United States Patent
Toyoda et al.

(10) Patent No.: US 9,766,820 B2
(45) Date of Patent: Sep. 19, 2017

(54) ARITHMETIC PROCESSING DEVICE, INFORMATION PROCESSING DEVICE, AND CONTROL METHOD OF ARITHMETIC PROCESSING DEVICE

(71) Applicant: FUJITSU LIMITED, Kawasaki-shi, Kanagawa (JP)

(72) Inventors: Yuta Toyoda, Kawasaki (JP); Koji Hosoe, Yamato (JP); Masatoshi Aihara, Hiratsuka (JP); Akio Tokoyoda, Fuchu (JP); Makoto Suga, Edogawa (JP)

(73) Assignee: FUJITSU LIMITED, Kawasaki (JP)

( * ) Notice: Subject to any disclaimer, the term of this patent is extended or adjusted under 35 U.S.C. 154(b) by 245 days.

(21) Appl. No.: 14/708,331

(22) Filed: May 11, 2015

(65) Prior Publication Data

US 2015/0339062 A1 Nov. 26, 2015

(30) Foreign Application Priority Data

May 20, 2014 (JP) ................................ 2014-104294

(51) Int. Cl.
*G06F 12/00* (2006.01)
*G06F 3/06* (2006.01)
(Continued)

(52) U.S. Cl.
CPC .......... *G06F 3/0611* (2013.01); *G06F 3/0656* (2013.01); *G06F 3/0658* (2013.01); *G06F 3/0673* (2013.01); *G06F 12/0802* (2013.01); *G06F 12/0859* (2013.01); *G06F 12/0879* (2013.01); *G06F 12/0831* (2013.01);
(Continued)

(58) Field of Classification Search
None
See application file for complete search history.

(56) References Cited

U.S. PATENT DOCUMENTS

| 4,802,125 A | 1/1989 | Yamada |
| 2013/0179644 A1* | 7/2013 | Tomi ............... G06F 12/084 711/144 |
| 2015/0120660 A1* | 4/2015 | Schreter ........... G06F 17/30351 707/626 |

FOREIGN PATENT DOCUMENTS

| EP | 0189944 A2 | 8/1986 |
| JP | 2001-222472 | 8/2001 |

OTHER PUBLICATIONS

Extended European Search Report dated Sep. 22, 2015 for corresponding European Patent Application No. 15167675.6, 7 pages.
(Continued)

*Primary Examiner* — Brian Peugh
(74) *Attorney, Agent, or Firm* — Fujitsu Patent Center

(57) ABSTRACT

An arithmetic processing device which connects to a main memory, the arithmetic processor includes a cache memory which stores data, an arithmetic unit which performs an arithmetic operation for data stored in the cache memory, a first control device which controls the cache memory and outputs a first request which reads the data stored in the main memory, and a second control device which is connected to the main memory and transmits a plurality of second requests which are divided the first request output from the first control device, receives data corresponding to the plurality of second requests which is transmitted from the main memory and sends each of the data to the first control device.

20 Claims, 14 Drawing Sheets

(51) Int. Cl.
*G06F 12/0802* (2016.01)
*G06F 12/0855* (2016.01)
*G06F 12/0879* (2016.01)
*G06F 12/0831* (2016.01)

(52) U.S. Cl.
CPC ............... *G06F 2212/1024* (2013.01); *G06F 2212/251* (2013.01); *G06F 2212/301* (2013.01); *G06F 2212/50* (2013.01)

(56) References Cited

OTHER PUBLICATIONS

European Office Action dated Jun. 14, 2017 for corresponding European Patent Application No. 15167675.6, 7 pages.

\* cited by examiner

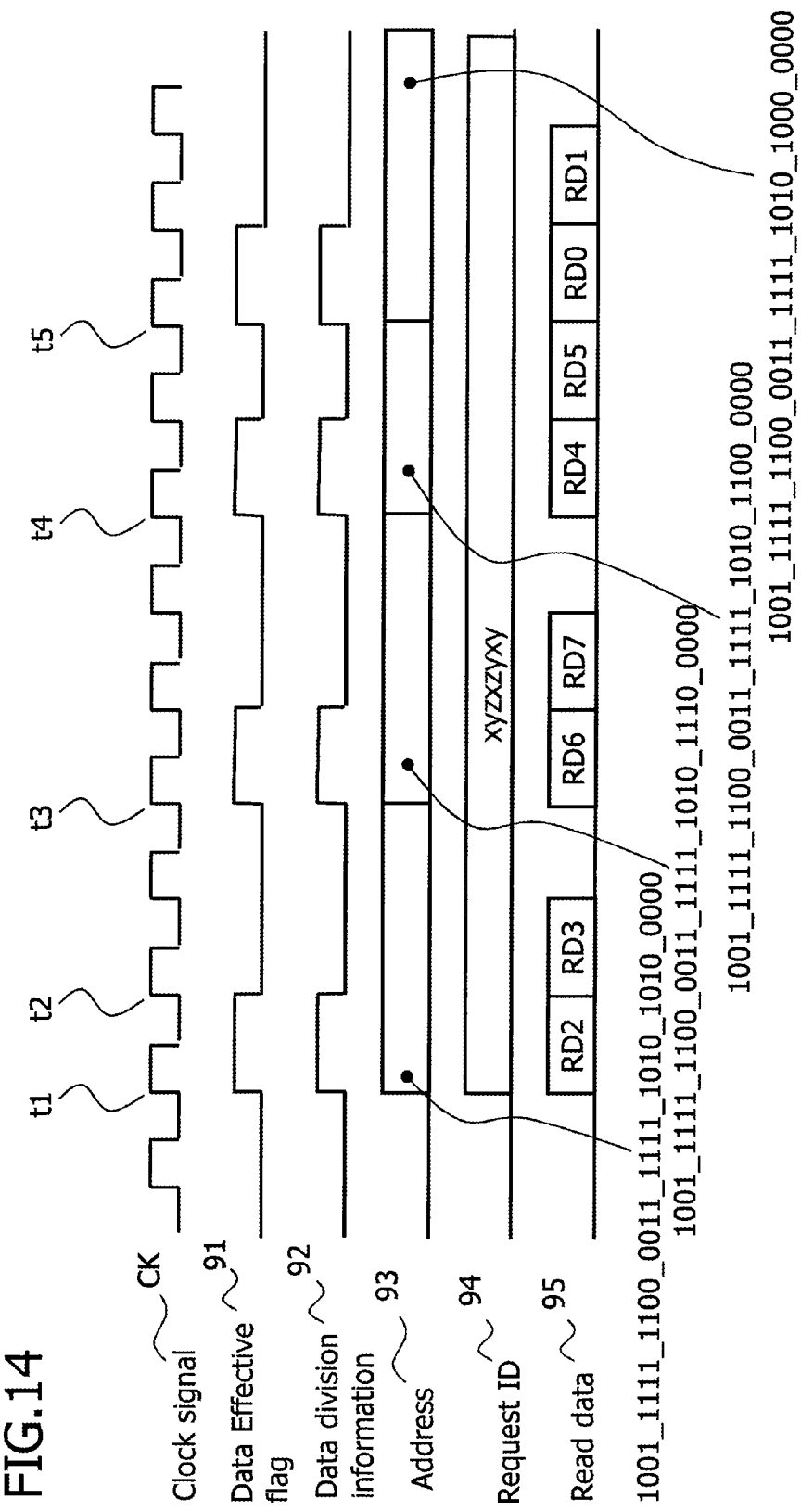

ARITHMETIC PROCESSING DEVICE, INFORMATION PROCESSING DEVICE, AND CONTROL METHOD OF ARITHMETIC PROCESSING DEVICE

CROSS-REFERENCE TO RELATED APPLICATION

This application is based upon and claims the benefit of priority of the prior Japanese Patent Application No. 2014-104294, filed on May 20, 2014, the entire contents of which are incorporated herein by reference.

FIELD

The embodiments discussed herein are related to an arithmetic processing device, an information processing device and a control method of arithmetic processing device.

BACKGROUND

Computing speed of a processor, which is established in the information processing device, such as a HPC (High Performance Computing) super computer, a server, a PC (Personal Computer) and a mobile-phone, etc., becomes high with the miniaturization of the manufacturing process. With high speed of the computing of the processor, it is desired that the capacity of the main memory (main memory) makes big and the bandwidth between the processor and the main memory makes wide.

Conventionally, a DIMM (Dual Inline Memory Module) has been adopted as a DRAM (Dynamic Random Access Memory) in the main memory. On the other hand, in recent years, a memory element incorporating a DRAM (Dynamic Random Access Memory) controller is offered. For example, HMC (Hybrid Memory Cube) is offered. Large capacity of the main memory and the wide bandwidth between the processor and the main memory are realized by providing the DRAM controller on the memory element side. The DRAM is disclosed in a patent document 1, for example.

CITATION LIST

Patent Document

[Patent document 1] Japanese Laid-Open Patent Publication No. 2001-222472.

SUMMARY

However, because the memory controller is separated from the memory controller, latency until a processor core reads the data may make large.

According to a first aspect of the embodiment, an arithmetic processing device which connects to a main memory, the arithmetic processor includes a cache memory which stores data, an arithmetic unit which performs an arithmetic operation for data stored in the cache memory, a first control device which controls the cache memory and outputs a first request which reads the data stored in the main memory, and a second control device which is connected to the main memory and transmits a plurality of second requests which are divided the first request output from the first control device, receives data corresponding to the plurality of second requests which is transmitted from the main memory and sends each of the data to the first control device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a timing chart explaining the request reply that the memory controller 30 outputs to the cache controller 20.

DESCRIPTION OF EMBODIMENTS

Hereinafter, embodiments will be described according to figures. But the technical range in the invention are not limited to the embodiments, are extended the subject matters disclosed in claims and its equivalents.

(Information Processing Device)

Figure 1:
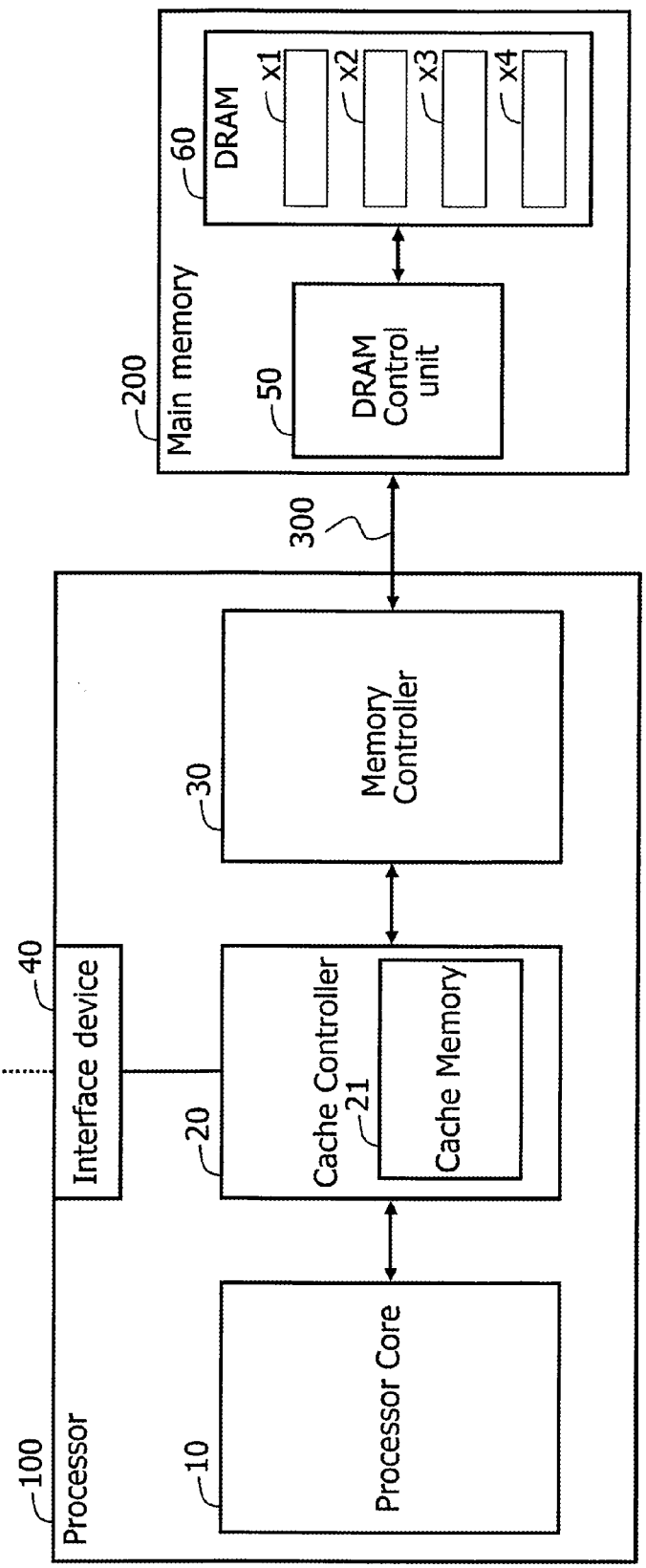
FIG. 1 is a diagram indicating the hardware constitution of the information processing device according to the embodiment.

FIG. 1 is a diagram indicating the hardware constitution of the information processing device according to the embodiment. The information processing device depicted by FIG. 1 includes a processor (an arithmetic processing device) 100 and a main memory 200. The processor 100 is connected to the main memory 200 through a bus 300 and performs high-speed serial communication. For example, the serial bus 300 is constructed by serial transfer bus of 16 lanes.

The processor 100 depicted by FIG. 1 includes a processor core (arithmetic unit) 10, a cache memory 21, a cache controller (first control unit) 20, a memory controller (second control unit) 30, an interface unit 40. The interface unit 40 is connected to other information processing devices through a crossbar switch (not illustrated in FIG. 1). Other information processing devices have the constitution like the information processing device depicted by FIG. 1, too.

The processor core 10 depicted by FIG. 1 decodes instructions which are fetched and executes various control and arithmetic operation depending on contents of the instruction. When the decoded instruction is a load instruction, the processor core 10 issues a read request which reads data and when the decoded instruction is a store instruction, the processor core 10 issues a write request to write the data. The processor core 10 depicted by FIG. 1 is illustrated by single core, but may be a plurality of cores.

The cache controller 20 depicted by FIG. 1 controls the cache memory 21. For example, the cache memory 21 depicted by FIG. 1 is a primary cache. But, the cache memory is not limited to this example, but the cache memory 21 may include the primary cache and a secondary cache, or the primary cache and the secondary cache and a third cache. The cache memory 21 memorizes data which is a high frequent access by processor core 10 temporarily. The cache memory 21 memorizes the data which is read from the main memory 200 per a block unit (called as a cache line as follows) defined by a system. The size of the cache line is defined based on the architecture that the processor 100 adopts. In the embodiment, the size of the cache line is 128 bytes, for example.

The cache controller 20 receives the read request and the write request that the processor core 10 published. The cache controller 20 judges whether the target data hits or miss-hits in the cache memory 21 in response to the read request and the write request from the processor core 10.

The cache controller 20 reads the target data from the cache memory when the data which is target by the read request from the processor core 10 are memorized in the cache memory 21 (called as a cache hit). On the other hand, when the target data are not memorized in the cache memory 21 (called as a cache miss-hit), the cache controller 20 sends a read request to read data from the main memory 200 to the memory controller 30. In addition, the cache controller 20, when the data, which is target by the write request, is cache hit, rewrites the target data which is the cache hit in the cache memory 21. On the other hand, the cache controller 20 writes the target data in the cache memory 21 newly when the target data of the write request is a cache miss-hit.

In addition, the cache controller 20 receives the DMA (Direct Memory Access) request such as the read requests that other information processing devices publish through the interface unit 40. In addition, the cache controller 20 publishes a pre-fetch instruction to read the data which has a possibility to be used by the arithmetic operation into the cache memory 21 beforehand. The cache controller 20 sends the read request, which reads the data which is targeted by the DMA request and the pre-fetch from the main memory 200, to the memory controller 30.

In addition, the cache controller 20 receives the read data which is read from the main memory 200 in response to the read request which is transmitted from the memory controller 30. And the cache controller 20 memorizes the read data into the cache memory 21 when the read data correspond to the read request by processor core 10 or the pre-fetch. In addition, the cache controller 20 outputs the read data to the interface unit 40 when the read data correspond to the DMA request.

The memory controller 30 depicted by FIG. 1 creates a packet according to a predetermined protocol based on the read request and the write request sent by the cache controller 20. And the memory controller 30 transmits the created packet to the main memory 200 through the serial bus 300. The packet is performed burst transfer for every data bus width in a plurality of cycle depending on the data length.

In addition, the memory controller 30 receives a reply packet including the read data based on the read request from the main memory 200 sequentially. And the memory controller 30 connects the information of the read request corresponding to the read data with the read data and sends it to the cache controller 20.

The main memory 200 depicted by FIG. 1, for example, is the HMC (Hybrid Memory Cube). In other words, the main memory 200 includes a DRAM (Dynamic Random Access Memory) constructed by a plurality of storage cell 60 and a DRAM (Dynamic Random Access Memory) controller unit (a third controller) 50. The DRAM controller unit 50 is mounted on a chip on the DRAM 60 side. And the main memory 200 connects to the processor 100 through the serial bus 300, thereby realizes broadband.

The DRAM 60 has a plurality of semi-conductor layers (silicon die) x1-x4. The plurality of semi-conductors x1-x4 are connected by TSV (Through-Silicon Via: silicon penetration electrode) and one vertical line which is laminated functions as single DRAM. Thereby, it is realized to pile up the DRAM element on the height direction, and it is achieved to make a great capacity by increasing the packaging density. And each of the DRAM elements is connected to a common logic base. Each of the DRAM elements is connected to the board from the logic-based back side, and the signal path (port) which is called as a plurality of lanes is drawn, thereby forming one serial link.

The DRAM controller unit 50 manages the memory space of the DRAM 60. In addition, the DRAM controller unit 50 arbitrates executes the timing of the request and controls the pipeline, thereby executing the request according to an effective order. In addition, because the DRAM controller unit 50 is provided on a chip on the DRAM 60 side, data length of the data, which is target by the request, is not a fixed length and has optional flexibility selected in a predetermined range. The DRAM controller unit 50 accesses the DRAM 60 to the data unit of fixed length based on the request to access the data of the variable-length record, thereby realizing the reading and writing of the data of the variable-length record.

When the DRAM controller unit 50 reads the read data corresponding to the read request, the DRAM controller unit 50 creates a respond packet including the read data according to a predetermined protocol. And the DRAM controller unit 50 transmits the respond packet to the processor 100 through the serial bus 300. The respond packet is performed burst transfer of every data bus width depending on the packet length for a plurality of cycles.

In this way, because the main memory 200 depicted by FIG. 1 is mounted a large-capacity DRAM 60 and includes the DRAM controller unit 50, a high capacity of memory is realized. In addition, because the main memory 200 is connected to the processor 100 through the serial bus 300, the band width makes a wide. On the other hand, since the chip of the processor 100 is separated from the chip of the DRAM controller unit 50, serial parallel conversion and the packet transmission between the chips occur. By this occurrence, the latency depending on the writing processing and the reading process of data may grow big.

In the embodiment, the memory controller 30 in the processor 100 divides a read request sent by the cache controller 20 and creates a plurality of read requests. And the DRAM controller unit 50 receives the plurality of read requests which is divided from the memory controller 30 sequentially. The DRAM controller unit 50 sends the read data which is read out based on the read request to the memory controller 30 sequentially.

Then, constitution of the memory controller 30 according to the embodiment will be explained. In the embodiment, the processing of the read request will be explained mainly.

(Memory Controller)

Figure 2:
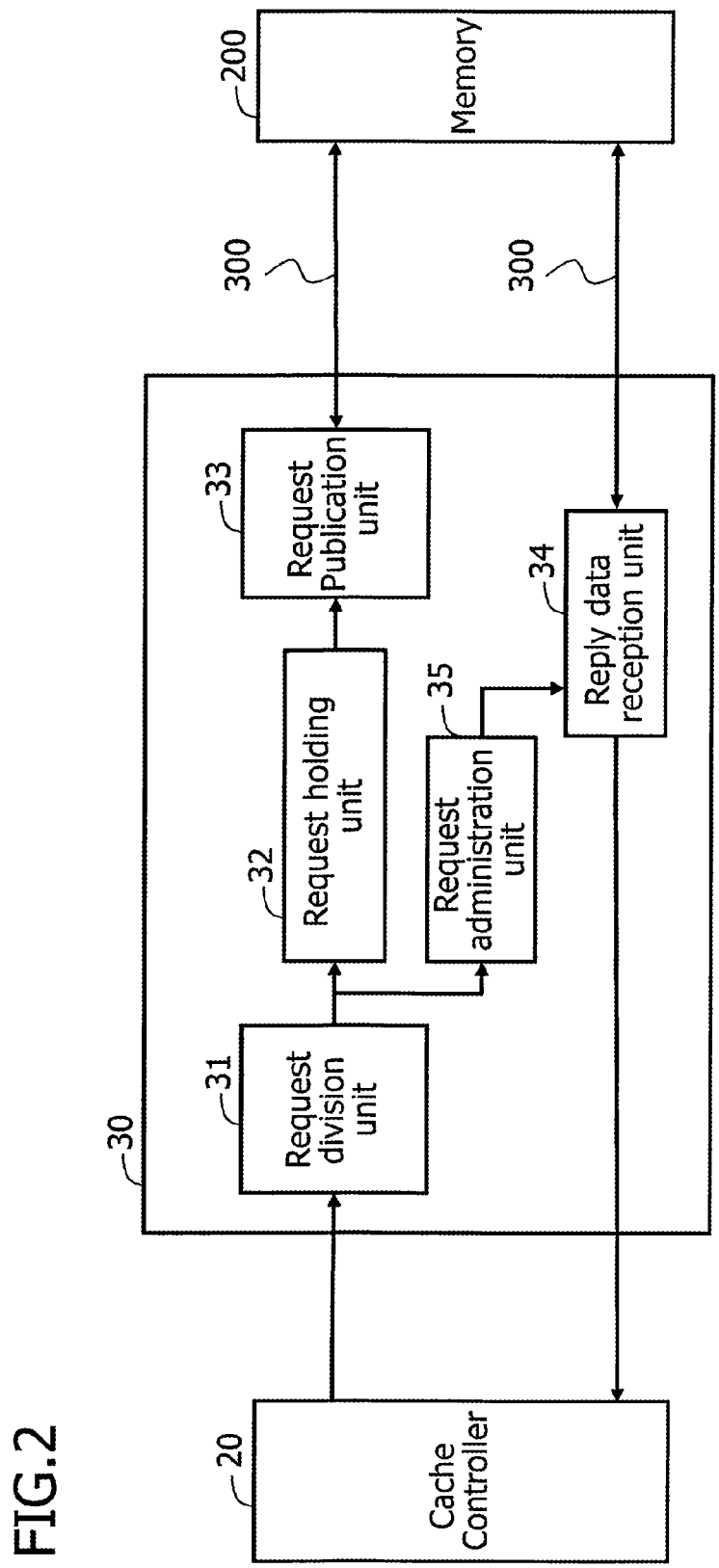
FIG. 2 is a hardware block diagram of the memory controller 30 illustrated by FIG. 1.

FIG. 2 is a hardware block diagram of the memory controller 30 illustrated by FIG. 1. The memory controller 30 depicted by FIG. 2 includes a request division unit 31, a request holding unit 32, a request publication unit 33, a respond data reception unit 34, and a request administration unit 35.

The request division unit 31 divides a read request into a plurality of read requests depending on the type of the read request. Specially, the request division unit 31 divides the read request and generates a plurality of read requests to be concrete when the read request is a request based on the cache miss-hit. On the other hand, the request division unit 31 does not divide the read request when the read request is a request based on one of the pre-fetch or the DMA request.

The request division unit 31 outputs the plurality of read requests which is divided and created, and single read request which is not to divided to the request administration unit 32. The request administration unit 32 holds the read request which is received and outputs it sequentially to the request publication unit 33.

In addition, the request division unit 31 outputs information of the plurality of read requests which is divided and created and single read request which is not to divided to the request administration unit 35. The request administration unit 35 manages the correspondence relationship between the read request and the read data which is read from the main memory 200 based on the read request and the read request according to a request tag (referring to FIG. 3). In addition, the request administration unit 35 manages the correspondence relationship between the plurality of read requests which is divided and the read request of the separately original based on the request tag.

The request publication unit 33 creates a packet according to a predetermined protocol for every read request. In addition, the request publication unit 33 adds a CRC (Cyclic Redundancy Check) code to a packet as check sum for detecting a part of the data changed. The CRC code is a code of the fixed size (for example, a 32 bits integer) which is calculated based on error detecting function for an input of data stream having any data length.

When the DRAM controller unit 50 receives the packet from the request publication unit 33, the DRAM controller unit 50 calculates the CRC code based on the data in which the packet includes. And the DRAM controller unit 50 compares the CRC code in which the packet includes with the CRC code which is calculated. When both CRC codes match with, the DRAM controller unit 50 determines that the data in which the packet includes do not change by the transfer. Accordingly, when both CRC code do not match with, the DRAM controller unit 50 requires the retransmission of the packet to the request publication unit 33.

When both CRC codes match with, the DRAM controller unit 50 reads the read data based on the read request from the DRAM 60. And the DRAM controller unit 50 calculates the CRC code as an input of the read data. The DRAM controller unit 50 creates the respond packet having the read data and the CRC code which is calculated, and transmits it to the memory controller 30.

The reply data reception unit 34 receives the respond packet from the DRAM controller unit 50 sequentially. The reply data reception unit 34 holds it until the receiving of the respond packet for the packet length completes. And the reply data reception unit 34 calculates the CRC code for an input of the read data included in the packet, and determines whether or not the calculated CRC code matches with the CRC included in the packet. When both CRC code do not match with, the reply data reception unit 34 requires the retransmission of the respond packet to the DRAM controller unit 50. When both CRC codes match with, the reply data reception unit 34 determines that the read data do not change by the transfer, and sends the read data to the cache controller 21.

In this way, the memory controller 30 according to the embodiment divides the read request into a plurality of read requests. Because the read request is divided, the data length of each data, which is read based on the read request each after the division, makes shorten. Because the data length of each data for the reading target becomes shorten, the reading time from of each data from the main memory 200 becomes shorten. In addition, because the data length of each data for the reading target becomes shorten, a time, that the reply data reception unit 34 performs the verification of the CRC code after started the reception of data, also becomes shorten, thereby shortening the reply time of each read request which is created by the division. Therefore, it is possible to lower the total latency of the read request each after the division by dividing the read request.

And data, of which the processor core 10 targets for the operation, are not all the data of the cache line size of which a separately original request targets for reading, but the data is often a part of data of the cache line size. Therefore, it is possible that the processor core 10 starts calculating it in response to the reception of the read data concerned, when the read data, which read based on the read request which is created by the division, includes data for operation. In other words, the processor core 10 does not have to wait for the reception of all the read data of the cache line size which is targeted by a separately original read request. Therefore, it is possible to start operation at an earlier stage because the processor core 10 receives the read data of the read request which is created by the division earlier.

In this way, it is possible that the processor 100 according to the embodiment makes the latency depending on the data reading of the processor core 10 small. Therefore, it is possible that the processor core 10 performs the arithmetic operation more effectively.

In addition, in the main memory 200, the DRAM controller unit 50 accesses for every access unit of fixed length data size to the DRAM 60. In other words, the DRAM controller unit 50 accesses the DRAM 60 per the access unit which is divided the data length of the data which is targeted by the read request for the read request which is not divided. Therefore, a time, in which the memory controller 30 needs for the division processing of the read request when dividing the read request, is not in a problem.

In addition, the data length of the read data which is sent to the memory controller 30 from the main memory 200 shortens, since the read request is divided. The error rate in the data transmission decreases by the data length shortening. Therefore, it is possible that the memory controller 30 controls a drop of the performance with the retransmission of the respond packet which occur based on the outbreak of the CRC error.

(Transmission Side of the Memory Controller)

Then, the constitution in the read request transmission side (the request division unit 31 and the request holding unit 32) in the memory controller 30 depicted by FIG. 2 will be explained in detail.

Figure 3:
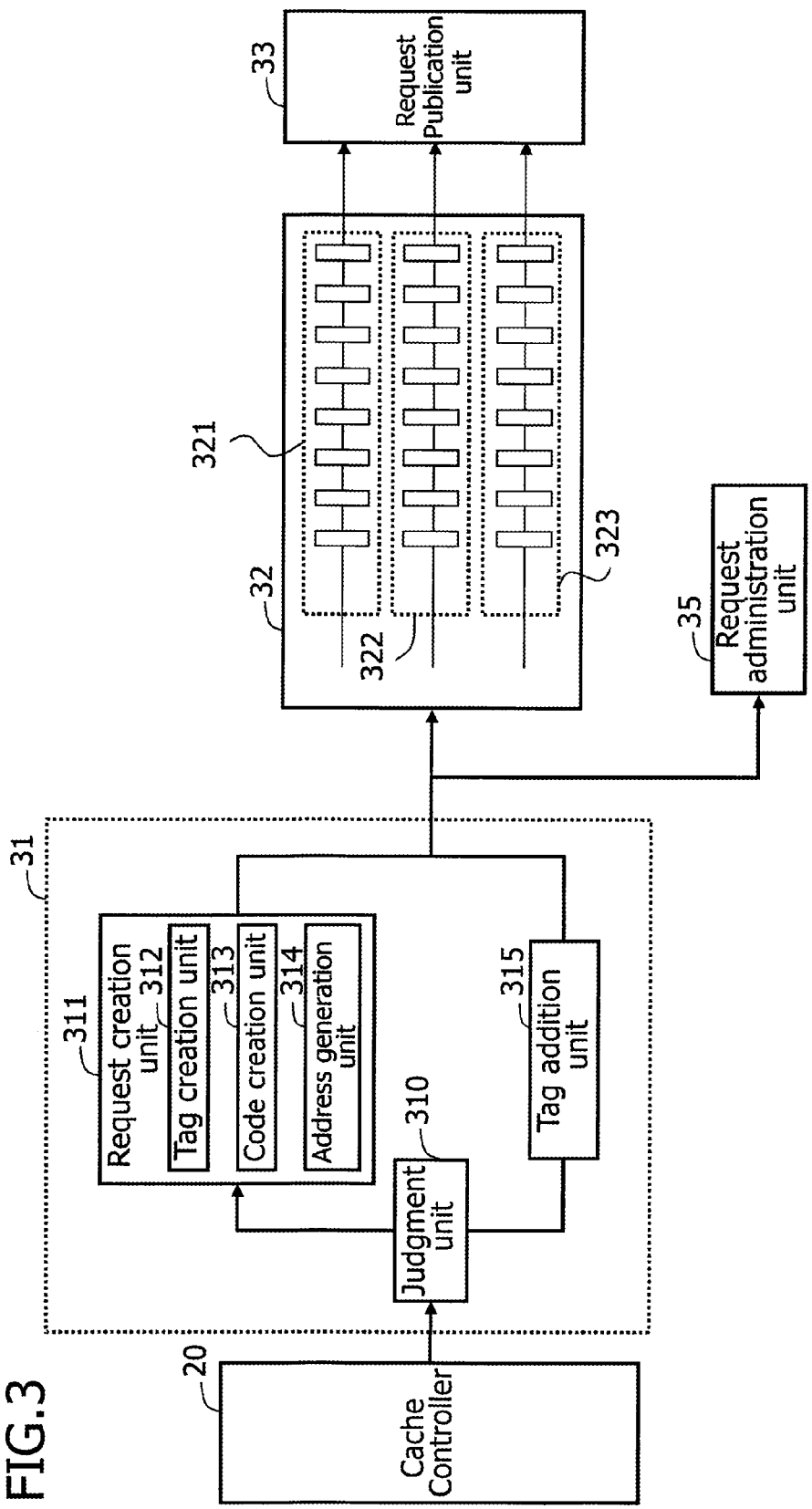
FIG. 3 is a detailed block diagram of the request division unit 31 and the request holding unit 32 in the memory controller 30 illustrated in FIG. 2.

FIG. 3 is a detailed block diagram of the request division unit 31 and the request holding unit 32 in the memory controller 30 illustrated in FIG. 2. As illustrated in FIG. 3, the request division unit 31 includes a judgment unit 310, a request creation unit 311, and a tag addition unit 315. In addition, the request creation unit 311 includes a tag creation unit 312, a code creation unit 313, and an address generation unit 314.

The judgment unit 310 determines whether or not divides the read request based on the request ID (Identification) 64 (referring to FIG. 4, FIG. 5) indicating the factor of the read request. For example, the cache controller 20 adds the request ID 64 at the time of the publication of the read request. The request ID 64 is information to distinguish the factor of the read requests such as the cache miss-hit, the pre-fetch, the DMA request. When the read request is the request based on the cache miss-hit, the judgment unit 310 divides the request based on the request ID. In addition, the judgment unit 310 does not divide the request based on the request ID, when the read request is a request based on one of the pre-fetch or the DMA request.

specially, when the read request is based on the DMA request, the interface unit 40 (referring to FIG. 1) sends data for the reading target to other information processing devices at one time. Therefore, the advantage of an operation, which divides data and makes latency of each individual read requests small, is small. Therefore, the judgment unit 310 determines that the read request based on the DMA request does not target for the division. In addition, because the pre-fetch is processing to read the data which has a possibility to be used in the calculating process widely, the advantage of an operation, which divides data and makes latency of each individual read requests small, is small. Therefore, the judgment unit 310 determines that the read request based on the pre-fetch does not target for the division.

In addition, the memory controller 10 is set a number of divisions "m" of the read request (m>1, integer) beforehand. For example, the number of divisions "m" is set based on the size per process unit of the processor core 10 and cache line size of the cache memory 21. As described above, the cache controller 20 performs the reading process of data and the writing process of data per a cache line unit. Therefore, the data length which is targeted by the read request indicates the size of the cache line.

For example, when the number of divisions "m" is bigger, the data length, which is targeted by each read request after the division, becomes shorten, and the probability, in which the read data which is read includes the data of the unit of which the processor core 10 is targeted for operation, becomes lower. On the other hand, when the number of divisions "m" is smaller, because the data length which is targeted by each read request after division makes longer, the probability, in which the read data which is read includes the data of the unit of which the processor core 10 is targeted for operation, becomes higher. On the other hand, when the number of divisions "m" is smaller, because the data length which is targeted by each read request after division makes longer, it is hard that the latency of each read request, which is created by the division, becomes small.

As described above, the size of the cache line according to the embodiment is 128 bytes. In addition, for example, the size per the processing unit of the processor core 10 is 32 bits. Therefore, the number of division is set so as to obtain a lower latency of each read request which is created by the division and to obtain a higher possibility that the read data which is read includes data of the unit for an operation target of the processor core 10, based on the cache line size "128 bytes" and the processing unit size "32 bits" of the processor core 10. For example, the number of divisions "m" of the read request according to the embodiment is set to "4".

Here, an example and a constitution of the read request that the cache controller 20 sends to the memory controller 30 will be explained.

Figure 4:
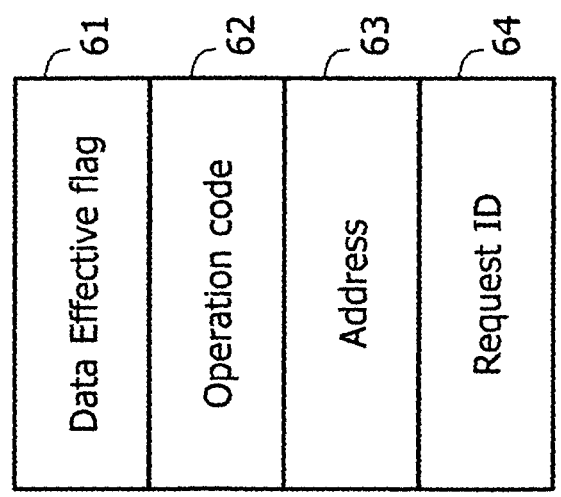
FIG. 4 is a diagram indicating format of the read request that the cache controller 20 sends to the memory controller 30.
Figure 5:
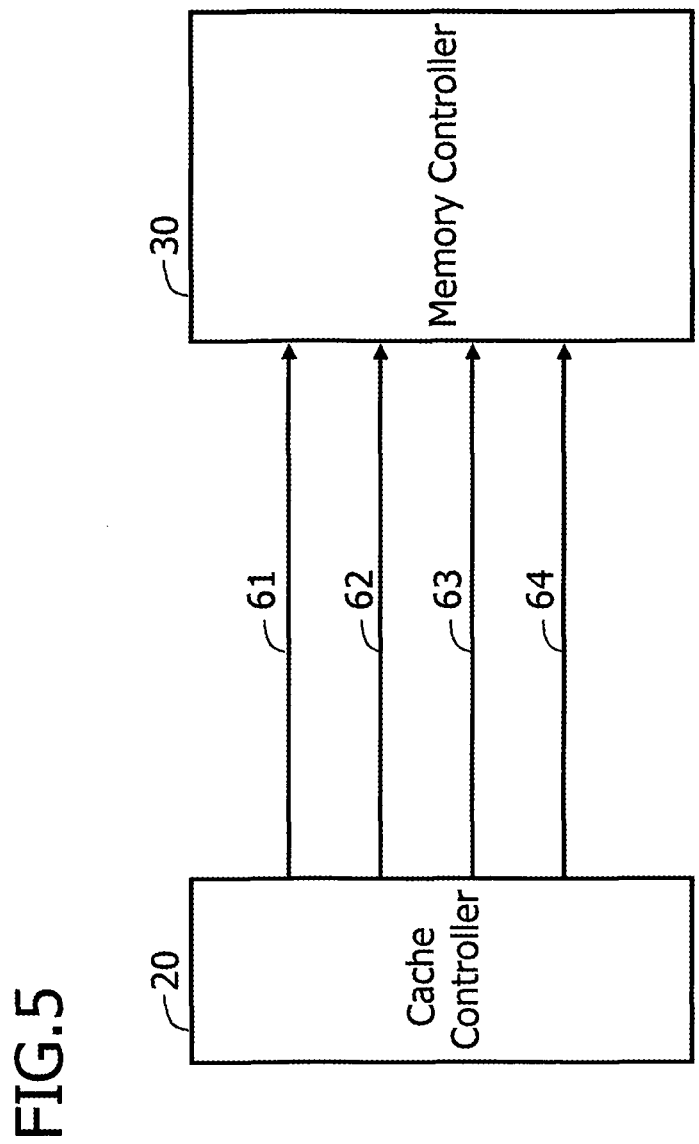
FIG. 5 is a diagram indicating the transmission example of the read request that the cache controller 20 sends to the memory controller 30.

FIG. 4 and FIG. 5 are diagrams explaining the read request that the cache controller 20 sends to the memory controller 30. FIG. 4 is a diagram indicating format of the read request that the cache controller 20 sends to the memory controller 30. In addition, FIG. 5 is a diagram indicating the transmission example of the read request that the cache controller 20 sends to the memory controller 30.

As illustrated in FIG. 4, the read request includes a format of a data effective flag 61, an operation cord 62, an address 63, and a request ID 64. The data effective flag 61 is a flag indicating whether the memory controller 30 imports the request. When the data effective flag 61 is a value "1", the memory controller 30 imports the request. The operation code 62 is an instruction code. The address 63 is an address where data for the reading is memorized of the DRAM 60. The request ID 64 is just what illustrated by FIG. 3.

In addition, FIG. 5 illustrates a transmission example of the read request which is explained in FIG. 4. The cache controller 20 transmits the data effective flag 61, the operation code 62, the address 63, and the request ID 64 explained in FIG. 4 to the memory controller 30 at 1 cycle.

Here, in the example, the cache controller 20 publishes the read request to the memory controller 30 based on the cache miss-hit corresponding to the load instruction for data of 128 bytes. In this case, the data effective flag 61 has value "1", and the operation code 62 indicates the reading of data of 128 bytes. In addition, the address 63 indicates a top address where the data of 128 bytes are memorized in the DRAM 60. The request ID 64 indicates that it is the read request based on the cache miss-hit.

Referring back to FIG. 3, the tag creation unit 312 in the request division unit 31 creates the request tag (identification information) of each read request which is created by the division. The request tag is information to distinguish the read request. In addition, the request tag connects the read request with the read data which is read from the main memory 200 based on the read request. Furthermore, the request tag connects each read request which is created by the division with an original read request before separation.

The memory controller 30 according to the embodiment sends the read request which is added the request tag to the main memory 200. And the memory controller 30 receives the read data which is added the request tag from the main memory 200. And the memory controller 30 identifies the read request corresponding to the read data based on the request tag. In addition, the memory controller 30 identifies the original read request before the separation based on the request tag, when the read data corresponds with the read request which is divided into.

In addition, the code creation unit 313 in the request division unit 31 creates operation code 62 of each read request which is created by the division, based on the operation code 62 (referring to FIG. 4 and FIG. 5) of the original read request before the separation. The details of the processing will be described later. In addition, the address generation unit 314 in the request division unit 31 generates address 63 of each read request which is created by the division, based on the address 63 (referring to FIG. 4 and FIG. 5) of the original read request before the separation. The details of the processing will be described later. And the request division unit 31 generates each read request based on created request tag, operation code 62, and address 63.

On the other hand, when the request is not divided, the tag addition unit 315 in the request division unit 31 creates a request tag and adds it to the read request. As described above, the memory controller 30 identifies the read request corresponding to read data based on the request tag, when the read data is received.

The request division unit 31 outputs each read request which is created by the division and the read request which is not divided to the request holding unit 32. The request holding unit 32 has a request queue. The request queue has flip-flop sequence 312, 322, 323 for each of the request tag, the operation code 62, and the address 63. The request queue holds the request sequentially and outputs it to the request publication unit 33.

In addition, the request division unit 31 outputs the request tag, the operation code 62, the address 63, and the request ID 64 of each read request which is created by the division, to the request administration unit 35. By the output, the request administration unit 35 manages the correspondence relationship between the request tag, the operation code 62, the address 63, and the request ID 64. In addition, the request division unit 31 outputs the operation code 62, the address 63 and the request ID 64 of the original read request before the separation, in addition to the request tag, the operation cord 62, the address 63 of each read request which is created by the division, to the request administration unit 35. By the output, the request administration unit 35 further manages the correspondence relationship between the request tag of the read request which is created by the division and the operation cord 62, address 63, the request ID 64 of the original read request before the separation.

Here, the specific example of the packet including the read request, in which the request publication unit 33 in the memory controller 30 transmits to the main memory 200, will be explained.

Figure 6:
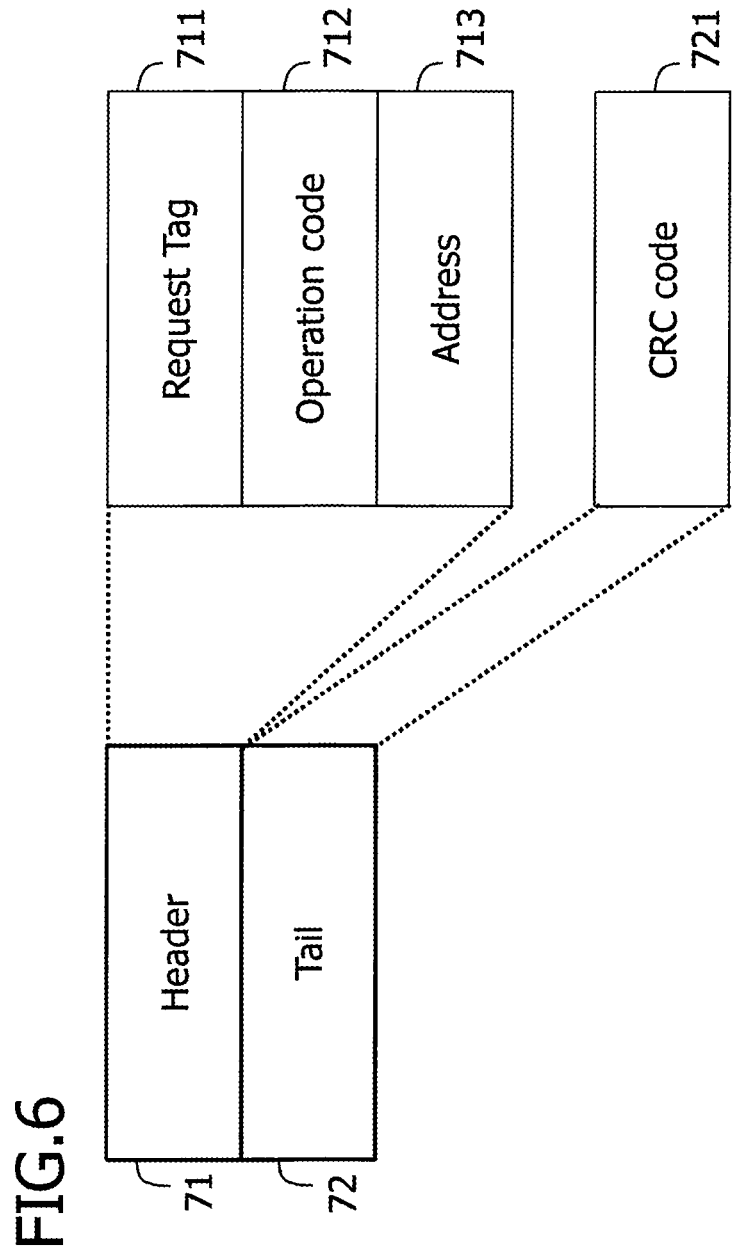
FIG. 6 is a diagram indicating the format of the packets including the read request that the memory controller 30 sends to the main memory 200.

FIG. 6 is a diagram indicating the format of the packets including the read request that the memory controller 30 sends to the main memory 200. The packet has a format of Header record 71 and Tail record 72 as represented by FIG. 6. The Header record 71 includes a request tag 711, an operation code 712, and an address 713. The Tail record 72 has CRC code 721.

The request tag 711 is just what is illustrated by FIG. 3. The linkage with the read data which is read by the read request and the contents of the read request is allowed by adding the request tag 711. In addition, by adding the request tag 711, the linkage with the read data and the contents of the original read request before the separation is allowed, when the read data corresponds with the read request which is divided by the separation.

In addition, in the case of the read request that is not divided, the operation cord 712 and the address 713 indicate the operation cord 62 which is represented by FIG. 4 and FIG. 5. On the other hand, in the case of the read request that is created by division, the operation code 712 and the address 713 indicate an operation code and an address that the request division unit 31 generated. The CRC code 721 is the CRC value which is calculated by an input of the request tag 711, the operation code 712, and the address 713, etc.

Following the format (referring to FIG. 6) of the packet, an example of the packet (FIG. 7) including the read request which is not divided and the plurality of packets (FIG. 8) including the read request which is created by the division, will be explained.

Figure 7:
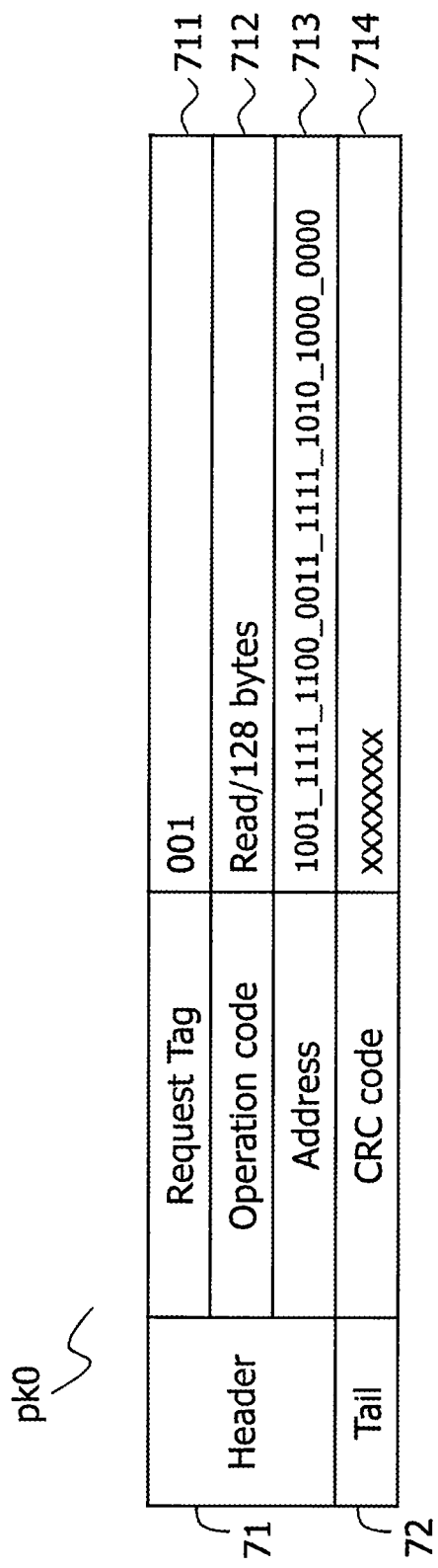
FIG. 7 is a diagram indicating an example of packet pk0 including the read request which is not divided.

FIG. 7 is a diagram indicating an example of packet pk0 including the read request which is not divided. In other words, the read request that the packet pk0 in FIG. 7 has is a read request based on the DMA request or the pre-fetch.

A packet pk0 depicted by FIG. 7 has the request tag "001" 711, the operation code "read of data of 128 bytes" 712, the address "1001_1111_1100_0011_1111_1010_1000_0000" 713, and the CRC code "xxxxxxxx" 714. In other words, the read request indicated by the packet pk0 is a request to read the data of 128 bytes from the address "1001_1111_1100_0011_1111_1010_1000_0000" 713 to the address "1001_1111_1100_0011_1111_1010_1110_0000" in the DRAM 60. The tag addition unit 315 (referring to FIG. 3) adds the request tag "001" 711 to the read request. The CRC code "xxxxxxxx" 714 is the CRC value which is calculated as an input of the request tag 711, the operation code 712, and the address 713, etc.

Figure 8:
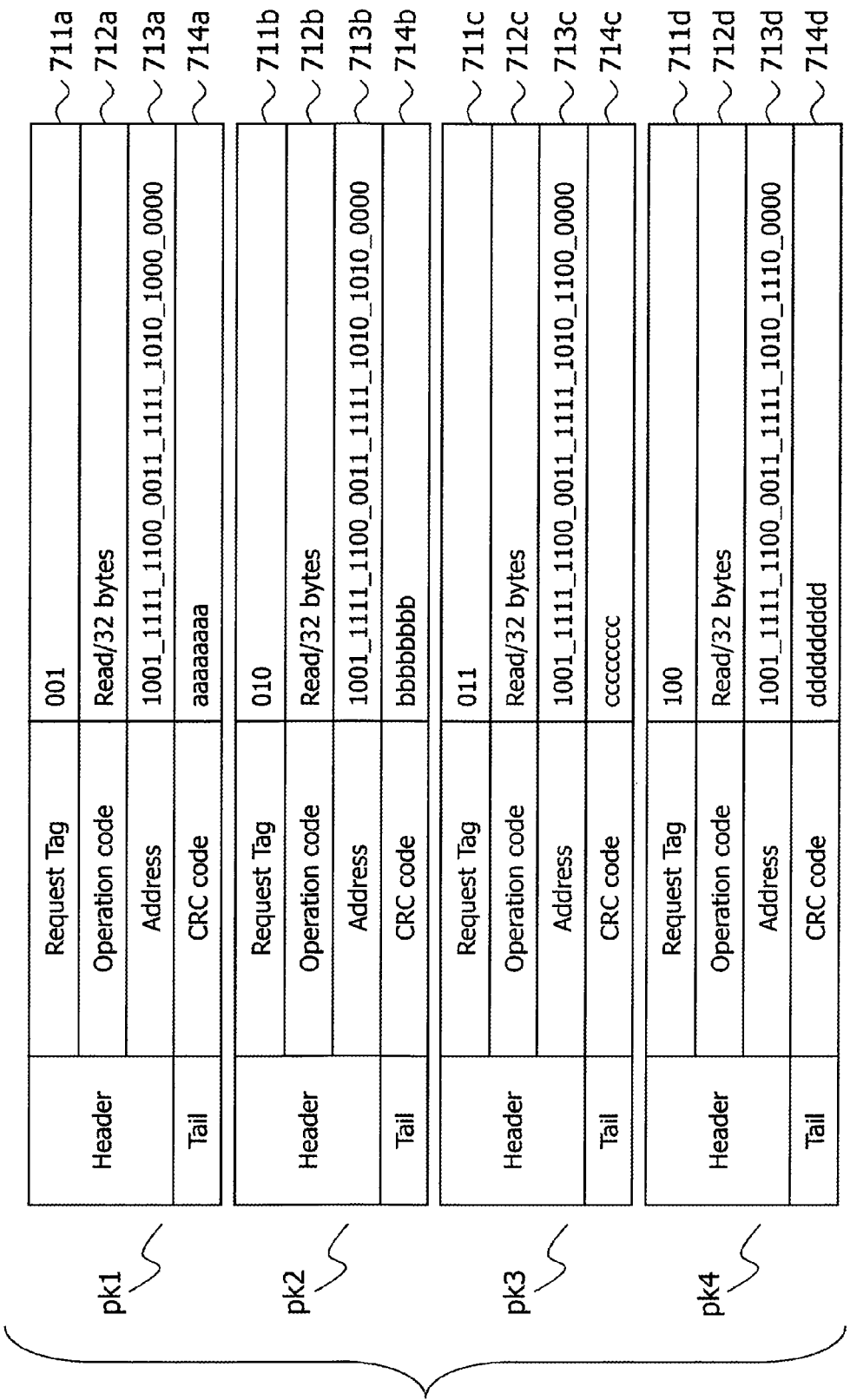
FIG. 8 is a diagram indicating an example of packets pk1-pk4 including the read request which is created by the division each.

FIG. 8 is a diagram indicating an example of packets pk1-pk4 including the read request which is created by the division each. In other words, the read request depicted by FIG. 8 is a read request which is created by the division based on the cash miss-hit.

The packets pk1-pk4 depicted by FIG. 8 are packets including each read request that the original read request before the separation is divided by four. In an example of FIG. 8, the original read request before the separation is a request to read the data of 128 bytes from the address "1001_1111_1100_0011_1111_1010_1000_0000" to the address "1001_1111_1100_0011_1111_1010_1110_0000" in the DRAM 60.

The tag creation unit 312 (referring to FIG. 3) creates four request tag 711. In addition, the code creation unit 313 (referring to FIG. 3) creates the operation code 712 of each read request indicating the read of data of 32 bytes based on the operation code 62 indicating the read of data of 128 bytes. In addition, the address generation unit 314 (referring to FIG. 3) divides the address range of 128 bytes from the address "1001_1111_1100_0011_1111_1010_1000_0000" into four. And the address generation unit 314 generates the top address of each address range which is divided into four as address 713 of each read request. And the request division unit 31 creates four read requests based on the created request tag 711, the operation cord 712, and the address 713.

The first packet pk1 depicted by FIG. 8 has the request tag "001" 711a, the operation code "read/32 byte" 712a, the address "1001_1111_1100_0011_1111_1010_1000_0000" 713a, and the CRC code "aaaaaaaa" 714a. The CRC code 714a is the CRC value which is calculated as an input of the request tag 711a, the operation cord 712a, and the address 713a.

In addition, the second packet pk2 has the request tag "010" 711b, the operation code "read/32 byte" 712b, the address "1001_1111_1100_0011_1111_1010_1010_0000" 713b, and the CRC code "bbbbbbbb" 714b. The CRC code 714*b* is the CRC value which is calculated as an input of the request tag 711*b*, the operation cord 712*b*, and the address 713*b*.

Similarly, the third packet pk3 has the request tag "011" 711*c*, the operation code "read/32 byte" 712*c*, the address "1001_1111_1100_0011_1111_1100_1100_0000" 713*c*, and the CRC code "cccccccc" 714*c*. The fourth packet pk4 has the request tag "100" 711*d*, the operation code "read/32 byte" 712*d*, the address "1001_1111_1100_0011_1111_1110_1110_0000" 713*d*, and the CRC code "dddddddd" 714*d*.

The main memory 200 processes the read request except division target and the read request after the division as an independent read request equally. The DRAM controller unit 50 in the main memory 200 receives the packet pk0-pk4 depicted by FIG. 7 and FIG. 8 from the memory controller 30 sequentially. The DRAM controller unit 50 calculates a CRC code of received packet pk0-pk4 from the data included in the packet pk0-pk4, and compares the calculated CRC code with the CRC code in which the packet has. When the CRC code does not match with, the DRAM controller unit 50 transmits the retransmission demand of the read request to the memory controller 30.

When the CRC code match with, the DRAM controller unit 50 reads data based on the read request. When the read request is divided and the data length is shortened by 1/m of the data length of the target data, it is possible that the DRAM controller unit 50 read the data from the DRAM 60 in a shorter time. And the DRAM controller unit 50 creates the respond packet which has the read data which is read and the CRC cord which is calculated from the read data sends it to the memory controller 30. When the read request is divided and the data length is shortened by 1/m of the data length of the target data, it is possible that the DRAM controller unit 50 sends the respond reply packet to the memory controller 30 in fewer cycles.

(Reception Side of the Memory Controller)

Then, the constitution of all parts (the reply data reception unit 34 and the request administration unit 35) in the read request reception side in the memory controller 30 depicted by FIG. 2 will be explained in detail.

Figure 9:
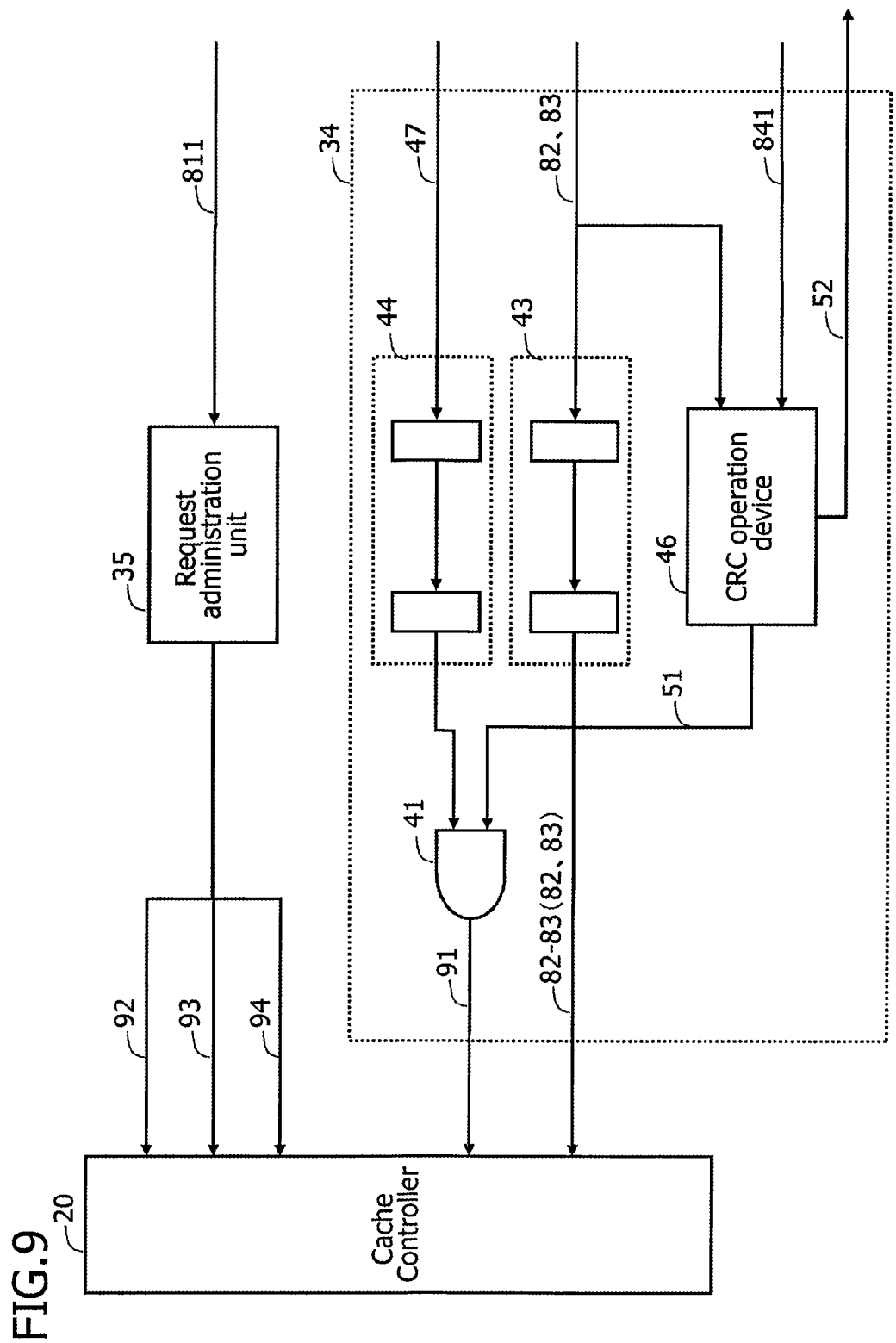
FIG. 9 is a block diagram illustrating the details of reply data reception unit 34 and the request administration unit 35 in the memory controller 30 depicted by FIG. 2.

FIG. 9 is a block diagram illustrating the details of reply data reception unit 34 and the request administration unit 35 in the memory controller 30 depicted by FIG. 2. The reply data reception unit 34 includes a CRC operation device 46, shift registers 42, 43, and a AND gate 41. The shift register 42 is a register which holds the data effective flag 47 having value "0" or "1". When the reply data reception unit 34 receives the reply packet from the DRAM controller unit 50, the reply data reception unit 34 changes the data effective flag 47 from the value "0" to the value "1". In addition, the shift register 43 holds the read data 82 and 83 for the data length.

Here, an example of the read request and the constitution of the reply packet that the reply data reception unit 34 in the memory controller 30 receives from the DRAM controller unit 50 will be explained.

Figure 10:
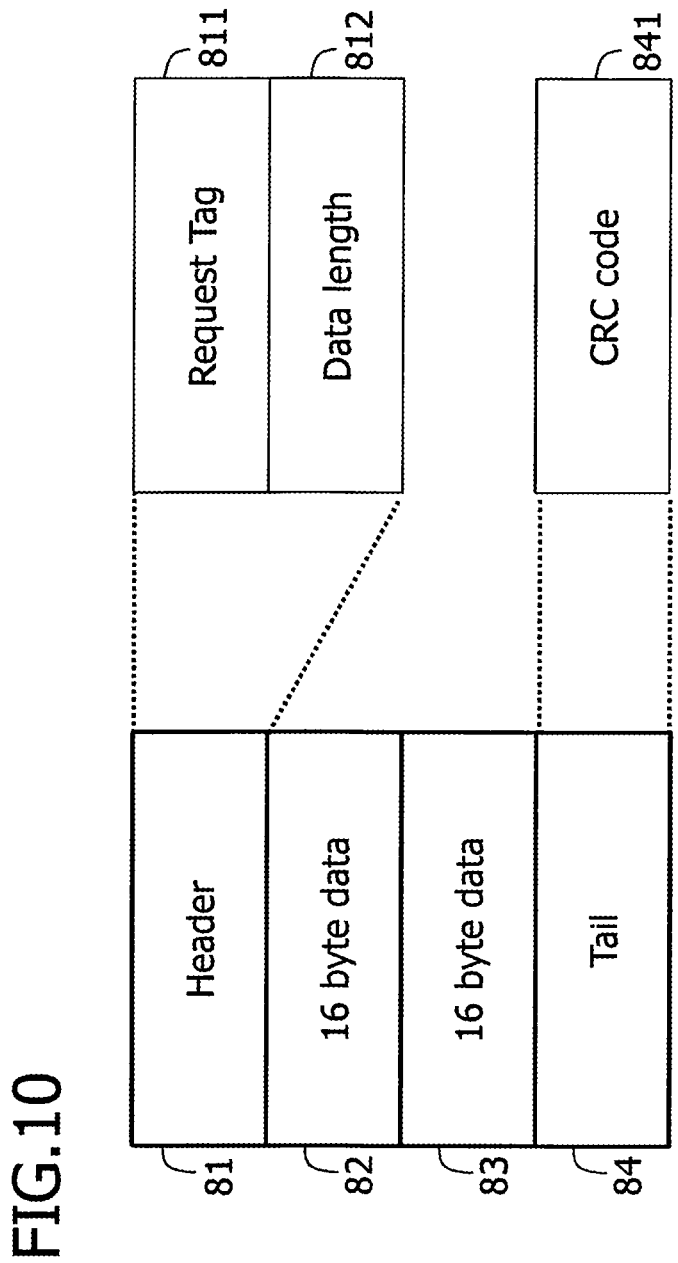
FIG. 10 is a diagram indicating format of the respond packet that the memory controller 30 receives from the DRAM controller unit 50.
Figure 11:
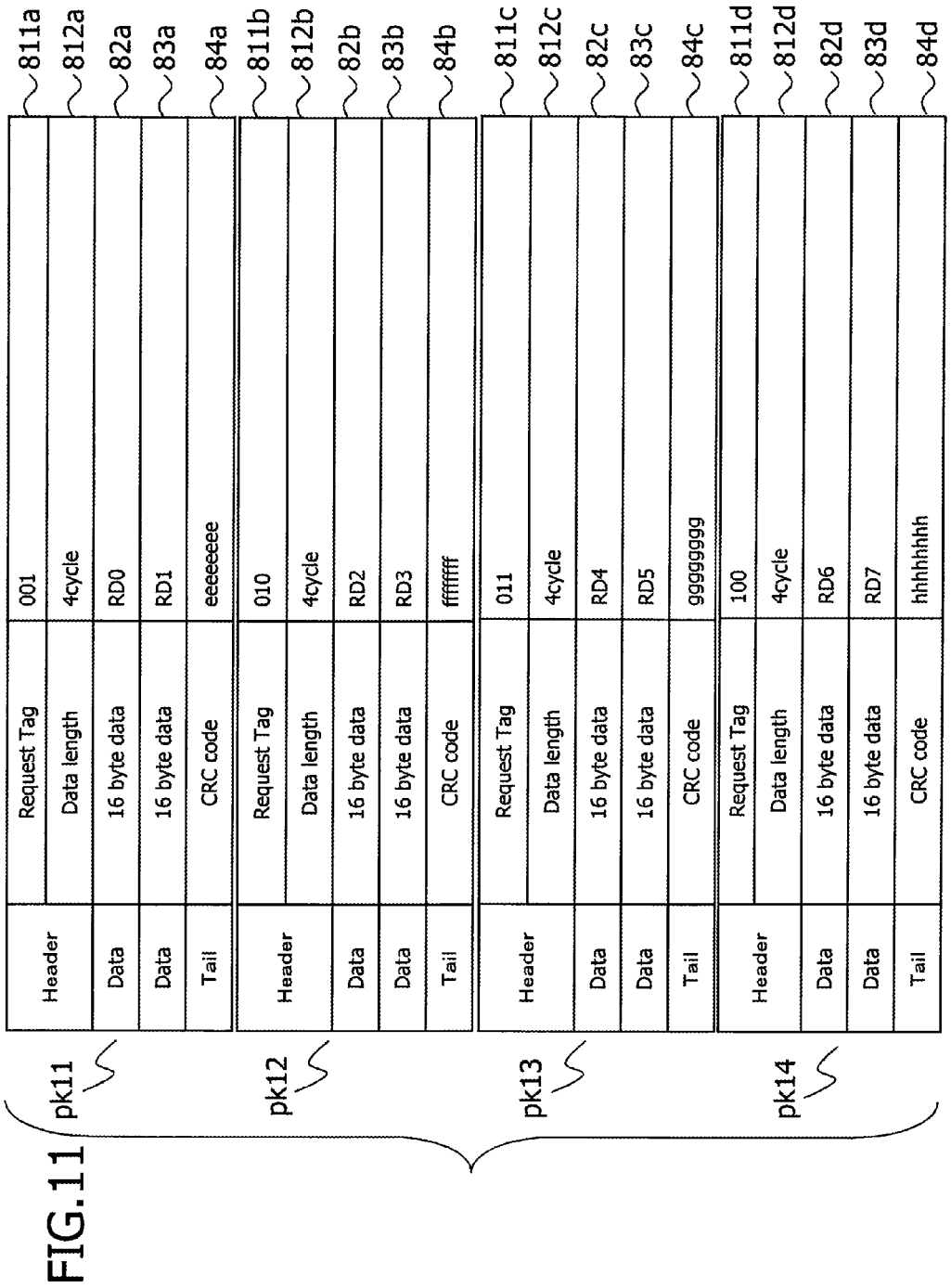
FIG. 11 is a diagram indicating an example of the respond packet that the memory controller 30 receives from the DRAM controller unit 50.

FIG. 10 and FIG. 11 are diagrams explaining the respond packet that the memory controller 30 receives from the DRAM controller unit 50. FIG. 10 is a diagram indicating format of the respond packet that the memory controller 30 receives from the DRAM controller unit 50. In addition, FIG. 11 is a diagram indicating an example of the respond packet that the memory controller 30 receives from the DRAM controller unit 50.

As illustrated in FIG. 10, the respond packet includes a format of a Header record 81, two data records 82 and 83 having the read data of 16 bytes, and a Tail record 84. The respond packet depicted by FIG. 10 includes the Header record and the Tail record like a packet depicted by FIG. 6. In addition, the respond packet of FIG. 10 and the packet of FIG. 6 have the request tag.

The Header record 81 has a request tag 811 and a data length 812 of the packet. The request tag 811 is information like the request tag 711 (referring to FIG. 6-FIG. 8) which is added to the read request corresponding to the read data. The Tail record 84 has a CRC cord 841. The CRC cord 841 is the CRC value which is calculated by an input of the read data.

FIG. 11 illustrates an example of the respond packet corresponding to the read request which is created by the division, depicted by FIG. 8. The first respond packet pk11 depicted by FIG. 11 is a respond packet corresponding to the first packet pk1 depicted in FIG. 8. The first respond packet pk11 has a request tag "001" 811*a*, a data length "4 cycles" 812*a*, each read data 82*a* and 83*a* of 16 bytes which are divided read data of 32 bytes from the address "1001_1111_1100_0011_1111_1010_1000_0000" into two, and a CRC code "eeeeeeee" 84*a*. The data length "4 cycles" 812*a* indicates a number of a cycle of the respond packet pk11 at the time of the burst transfer. The CRC code 84*a* is the CRC value which is calculated by an input of the read data 82*a*, 83*a*.

The second respond packet pk12 depicted by FIG. 11 is a respond packet corresponding to the second packet pk2 depicted by FIG. 8. The second respond packet pk12 has a request tag "010" 811*b*, a data length "4 cycles" 812*b*, each read data 82*b* and 83*b* of 16 bytes which are divided the read data of 32 bytes from the address "1001_1111_1100_0011_1111_1100_1010_0000" into two, and a CRC code "ffffffff" 84*b*. The CRC code 84*b* is the CRC value which is calculated by an input of the read data 82*b*, 83*b*. Similarly, the third respond packet pk13 depicted by FIG. 11 is a respond packet corresponding to the third packet pk3 depicted by FIG. 8, and the fourth respond packet pk14 depicted by FIG. 11 is a respond packet corresponding to the fourth packet pk4 depicted by FIG. 8.

Referring back to FIG. 9, the CRC operation device 46 performs a CRC check of the read data 82 and 83 included in the respond packet pk11-pk14. The CRC operation device 46 is input the read data 82, 83 included in the respond packets pk11-pk14 and the CRC code 841 included in the respond packets pk11-pk14. The CRC operation device 46 calculates a CRC code by an input of the read data 82, 83. And the CRC operation device 46 compares the CRC code which is calculated with the CRC code 841 included in the respond packets pk11-pk14. When the CRC operation device 46 outputs a CRC result matching signal "1" 51 when the CRC codes match with, and outputs the CRC result matching signal "0" 51 when the CRC codes do not match with, to the AND gate circuit 41. In addition, the CRC operation device 46 sends the retransmission request 52 of the respond packets pk11-pk14 to the DRAM controller unit 50 when the CRC codes do not match.

When the respond packet is a respond packet corresponding to the read request which is created by the division of the respond packet, the CRC operation device 46, for example, sends the retransmission request 52 of only the respond packet in which the CRC codes do not match with, to the DRAM controller unit 50. In addition, in this case, the CRC operation device 46 may send the retransmission request 52 of the other respond packets corresponding to other read requests generated based on the same original read request in addition to the respond packet that the CRC code do not match.

The AND gate circuit 41 outputs a logical product of the CRC result matching signal 51 and the data effective flag 47 to the cache controller 20, as the data effective flag 91. When the CRC result matching signal 51 and the data effective flag 47 are the value "1" together, the AND gate circuit 41 outputs the data effective flag 91 of value "1" to the cache controller 20. In other words, the AND gate 41 outputs the data effective flag 91 of value "0" to the cache controller 20, when the CRC code do not match with and the CRC result matching signal 51 is value "0".

The cache controller 20 imports the read data 82-83 (82, 83), the data division information 92, the address 93, the request ID 94 as trigger in which the data effective flag 91 changes to the value "1". Therefore, it is possible to prevent that the cache controller 20 imports the read data 82-83 (82, 83) in which a value changed into due to the data transmission mistake when the CRC code do not match with by the reply data reception unit 34.

The request administration unit 35 acquires data division information 92, the address 93, and the request ID 94 from an input of the request tag 811 included in the respond packets pk11-pk14 and outputs it to the cache controller 20. The data division information 92 is information to indicate whether the read request corresponding to the read data 82, 83 is a request which is created by the division. In addition, the address 93 indicates an address of DRAM 60 which is read the read data 82, 83. The request ID 94 indicates the factor of the read request corresponding to the read data 82, 83. In addition, the request ID 94 is the same as information (referring sign "64" in FIG. 4) which is added to the read request when the cache controller 20 publishes the read request.

The request administration unit 35 determines whether the original read request before the division connects with the read request corresponding to the read data 82, 83 by an input of the request tag 811, based on the information of the read request which is managed. When the original read request before the division is connected with the request tag 811, the request administration unit 35 sets the data division information 92 to the value "1". In addition, the request administration unit 35 sets the data division information 92 to the value "0", when the original read request before the division is not connected with request tag 811.

In addition, the request administration unit 35 identifies the read request of which the read data 82, 83 correspond to, by an input of the request tag 811, based on the information of the read request which is managed. And the request administration unit 35 acquires the operation code and the address 93 and the request ID 94 of the read request which is identified. And the request administration unit 35 outputs the address 93 and the request ID 94 to the cache controller 20.

Figure 12:
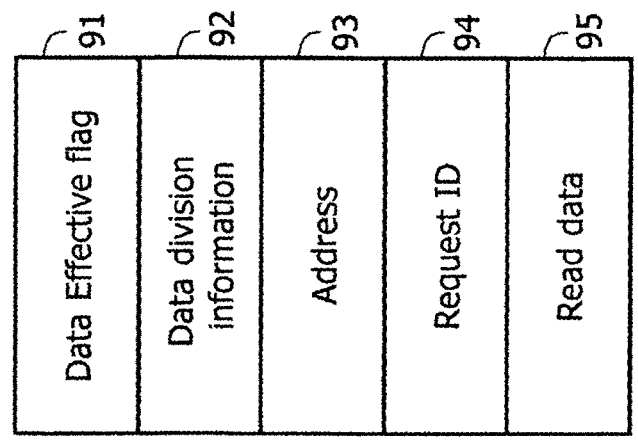
FIG. 12 is a figure indicating the format of the request reply that the memory controller 30 transmits to the cache controller 20.
Figure 13:
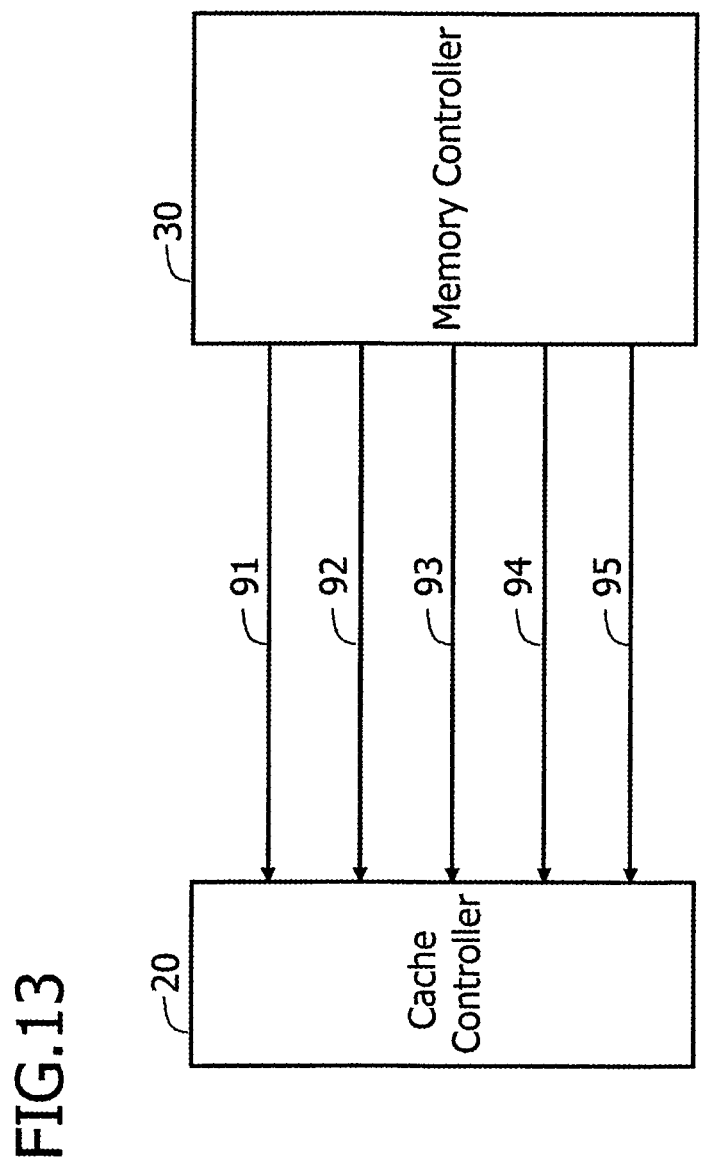
FIG. 13 is a diagram explaining a transmission example of the request reply that the memory controller 30 transmits to the cache controller 20.

FIG. 12 and FIG. 13 are diagrams explaining the request reply that the memory controller 30 transmits to the cache controller 20. FIG. 12 is a figure indicating the format of the request reply that the memory controller 30 transmits to the cache controller 20. FIG. 13 is a diagram explaining a transmission example of the request reply that the memory controller 30 transmits to the cache controller 20.

As represented by FIG. 12, the request reply transmitted to the cache controller 20 includes a format of the data effective flag 91, the data division information 92, the address 93, the request ID 94, and the read data 95. The data division information 92, the address 93, the request ID 94 are just what they mentioned above.

FIG. 13 indicates a transmission example of the request reply which is explained in FIG. 12. The memory controller 30 transmits the data effective flag 91, the data division information 92, the address 93, and the request ID 94 to the cache controller 20 at 1 cycle. In addition, when the data length of the read data 95 is 32 bytes (for example, FIG. 10 and FIG. 11), the memory controller 30 divides the read data 95 into 2 cycles and transmits to the cache controller 20.

When the data effective flag 91 changes to the value "1", the cache controller 20 acquires the data division information 92, the address 93, the request ID 94, and the read data 95. The cache controller 20 determines that the read request corresponding to the read data 95 is a read request which is not divided into, when the data division information 92 is the value "0", for example.

And the cache controller 20 judges whether the read request is based on any one of the DMA request and the pre-fetch based on the request ID 94. When the cache controller 20 judges to be based on the DMA request, the cache controller 20 outputs the read data 95 to the interface unit 40. On the other hand, the cache controller 20 memorizes the read data 95 in address 93 and an address identified based on the request ID 94 in the cache memory 21, when it is judged to be based on the pre-fetch.

In addition, when the data division information 92 is value "1", the cache controller 20 judges that the read request corresponding to the read data 95 is a read request which is created by the division. And the cache controller 20 memorizes the read data 95 in address 93 and an address identified based on the request ID 94 in the cache memory 21. In addition, when the read data 95 is the data which is targeted the operation by the processor core 10, the cache controller 20 notifies it of the processor core 10.

FIG. 14 is a timing chart explaining the request reply that the memory controller 30 outputs to the cache controller 20. A timing chart in FIG. 14 includes a clock signal CK in addition to the data effective flag 91, the data division information 92, the address 93, the request ID 94, and the read data 95 which are explained in FIG. 13.

According to the timing chart represented by FIG. 14, the memory controller 30 outputs the data effective flag 91 of value "1" and the data division information 92, the address "1001_1111_1100_0011_1111_1100_1010_0000" 93, the request ID "xyzxyzxy" 94, and the read data "RD2" 95 to the cache controller 20 in 2nd clock t1. In addition, in succeeding 3rd clock t2, the memory controller 30 outputs the data effective flag 91 of value "0", the data division information 92, the address "1001_1111_1100_0011_1111_1100_1010_0000" 93, the request ID "xyzxyzxy" 94, and the read data "RD3" 95 to the cache controller 20. In addition, in succeeding 4th clock, the memory controller 30 does not output the read data 95.

Therefore, the cache controller 20 acquires the data division information "1" 92, the address "1001_1111_1100_0011_1111_1100_1010_0000" 93, the request ID "xyzxyzxy" 94, and the read data "RD2, RD3" 95, as a trigger of changing the data effective flag 91 to the value "1" in 2nd clock. And the cache controller judges that the read data "RD2, RD3" 95 is a read request which is created by the division, based on the data division information 92. In addition, the cache controller 20 distinguishes an address of the cache memory 21 for storing the read data 95 and memorizes the read data "RD2, RD3" 95 to the cache memory 21

Similarly, the cache controller 20 acquires the data division information "1" 92, the address "1001_1111_1100_0011_1111_1100_1110_0000" 93, the request ID "xyzxyzxy" 94, and the read data "RD6, RD7" 95 as a trigger of changing the data effective flag 91 to the value "1" in 5th clock t3. And the cache controller 20 memorizes the read data "RD6" "RD7" 95 in a corresponding address in the cache memory 21, based on the data division information 92, the address 93, and the request ID 94.

In addition, the cache controller 20 acquires the data division information "1" 92, the address "1001_1111_1100_0011_1111_1100_1100_0000" 93, the request ID "xyzxyzxy" 94, and the read data "RD4, RD5" 95 as a trigger of changing the data effective flag 91 to the value "1" in 8th clock t4, and memorizes it in a corresponding address in the cache memory 21. In addition, the cache controller 20 acquires the data division information "1" 92, the address "1001_1111_1100_0011_1111_1100_1000_0000" 93, the request ID "xyzxyzxy" 94, and the read data "RD0, RD1" 95 as a trigger of changing the data effective flag 91 to the value "1" in 10th clock t5 and memorize it in a corresponding address in the cache memory 21.

As represented by FIG. 14, the cache controller 20 may receive the read data "RD2, RD3" 95 earlier than the read data "RD0, RD1" 95. In other words, the process order of the read request which is created by the division does not always depend on the order of addresses which are targeted. In an example of FIG. 14, when the data, in which the processor core 10 targeted for operation, corresponds, for example, to the read data "RD2, RD3", it is possible that the processor core 10 starts calculating it before the reception of all read data "RD0-RD7" completes.

In contrast, when not being dividing the read request based on the cache miss-hit, the processor core starts calculating it based on the operation target data "RD2, RD3" after all read data "RD0-RD7" reception was completed. The latency which the processor core reads the all data "RD0-RD7" has a bigger than a latency in which the reading of the data "RD2, RD3" is required. Therefore, it is possible that the processor 100 according to the embodiment lower the latency required the reading processing by dividing the read request based on the cache miss-hit.

As described above, a processor (an arithmetic processing device) 100 connects to a main memory (200), and has a cache memory 21 which stores data, a processor core (an arithmetic unit) 10 which performs an arithmetic operation for data stored in the cache memory, and a cache controller (a first control device) 20 which controls the cache memory and outputs a first request which reads the data stored in the main memory. And the arithmetic processing device (the processor) 100 has a memory controller (a second control device) 30 which is connected to the main memory 200 and transmits a plurality of second requests (read requests) which are divided the first request output from the cache controller (first control device) 20 to the main memory 200, receives data corresponding to the plurality of second requests which is transmitted from the main memory 200 and sends each of the data to the first control device.

The data length which is read based on the read request after the division shortens by dividing the read request. Therefore, the reading time for data in main memory 200 becomes short, and the number of the cycles when performing a burst transfer of the read data to the processor 100 decreases. Therefore, it is possible to make the latency per each read request that is created by division.

And the processor core 10 often targets for operation only some data among data of the cache line size that the original request before division targets for operation. When the read data, which is read based on the read request that is created by the division, includes data for the operation, it is possible that the processor core 10 starts calculating it in response to the reception of the read data corresponding to the read request after the division that the latency is small. Therefore, it is possible to calculate it effectively because the processor core 10 starts calculating it in an earlier timing.

In addition, the memory controller (second control device) 30 in the processor according to the embodiment creates the plurality of second requests (read requests) of which each reading target is an address range which is divided an address region of reading target of the first request. Therefore, it is possible that the memory controller 30 creates the plurality of second requests based on the first request.

Further, the memory controller (second control device) 30 in the processor according to the embodiment creates the plurality of second requests (read request) and transmit the plurality of second requests to the main memory 200 when the first request is based on a miss-hit of the cache memory 21 which is controlled by the cache controller (first control device) 20. And the memory controller (second control device) 30 transmits the first request to the main memory 200 when the first request is a request based on either one of pre-fetch and direct memory access.

The memory controller 30 does not target the read request based on the DMA request and the pre-fetch that an advantage, in which the latency of individual read requests makes small by dividing the data, is small. Therefore, it is possible that the memory controller 30 targets the read request based on the cache miss-hit that an advantage, in which the latency of individual read requests makes small, is big by dividing data.

Further, the memory controller (second control device) 30 in the processor according to the embodiment creates the plurality of second requests based on the number of divisions (m) for the first request to be set based on a size of processing unit of the arithmetic unit 10 and a cache line size of the cache memory 21. By this configuration, it is possible that the memory controller 30 makes the latency of each read request that is created by the division small, and divides the read request in appropriate number of divisions to raise the probability that the read data includes the data of the unit for the operation.

Further, the cache controller (first control device) 20 in the processor according to the embodiment receives the data from main memory 200 corresponding to the second request and stores in the cache memory 21 when the first request (read request) is a request based on the miss-hit of the cache memory 21 and notify the processor core (arithmetic unit) 10 when the data corresponding to the second request is data in which the processor core (arithmetic unit) 10 targets for the operation. By this configuration, it is possible that the processor core 10 starts an arithmetic operation at an earlier timing based on the read request which is created by the division.

Further, the main memory 200 according to the embodiment has a plurality of memory elements (DRAM) 60 which stores data, and the DRAM controller unit (a third control device) 50 which accesses the plurality of memory elements in data unit of a fixed length, reads the data of a variable-length record, and sends to the memory controller (second control device) 30 in response to the second request which targets the variable-length record.

By this construction, it is possible that the memory controller 30 sends the read request, which has a different data length of the target data from that of the original read request before the division, to the main memory 200.

Further, the memory controller (second control device) 30 in the processor according to the embodiment receives a first CRC code (cyclic-redundancy check value) based on the data in addition to the data corresponding to the first and second requests from the main memory 200, creates a second CRC code (cyclic-redundancy check value) based on the data corresponding to the first and second requests which are received. And the memory controller (second control device) 30 determines that the data corresponding to the first and second requests which are received is effective when the first CRC code (cyclic-redundancy check value) matches with the second CRC code (cyclic-redundancy check value).

By the CRC check, it is possible to restrain the degradation with the retransmission of the read data by the CRC error, because the memory controller 30 divides the read request and shortens the data length of the read data, thereby reducing the incidence of CRC error.

Further, the memory controller (second control device) 30 in the processor according to the embodiment sends request tag (identification information) to connect the second request with the first request which is an origin of division in addition to the second request to the main memory 200. And the memory controller (second control device) 30 receives the request tag (identification information) with the data corresponding to the second request from the main memory 200, and identify the first request which is the origin of the division corresponding to the data which is received based on the request tag (identification information). By using the request tag, it is possible that the memory controller 30 identifies the original read request before the division corresponding to the read data which is received from the main memory 200.

Further, the cache controller (first control device) 20 in the processor according to the embodiment specifies an address of the cache memory 21 which stores the data corresponding to the second request which is received, based on the original first request before the division which is specified. By the specified first request, it is possible that the memory controller 30 identifies an address of cache memory 21 for writing the read data by identifying the original read request before the division based on the request tag.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device which connects to a main memory, the arithmetic processor comprising:
   a cache memory which stores data;
   an arithmetic unit which performs an arithmetic operation for data stored in the cache memory;
   a first control device which controls the cache memory and outputs a first request which reads the data stored in the main memory; and
   a second control device which is connected to the main memory and transmits a plurality of second requests which have been divided from the first request output from the first control device, receives data corresponding to the plurality of second requests which is transmitted from the main memory and sends each of the data to the first control device.

2. The arithmetic processing device according to claim 1, wherein the second control device is configured to create the plurality of second requests of which each reading target is an address range which has been divided from an address region of reading target of the first request.

3. The arithmetic processing device according to claim 1, wherein the second control device is configured to create the plurality of second requests and transmit the plurality of second requests to the main memory when the first request is based on a miss-hit of the cache memory which is controlled by the first control device, and to transmit the first request to the main memory when the first request is a request based on either one of a pre-fetch and a direct memory access.

4. The arithmetic processing device according to claim 1, wherein the second control device is configured to create the plurality of second requests based on the number of divisions for the first request to be set based on a size of processing unit of the arithmetic unit and a cache line size of the cache memory.

5. The arithmetic processing device according to claim 3, wherein the first control device is configured to receive the data from the main memory corresponding to the second request and store in the cache memory when the first request is a request based on the miss-hit of the cache memory and notify the arithmetic unit when the data corresponding to the second request is data in which the arithmetic unit targets for the operation.

6. The arithmetic processing device according to claim 1, wherein the main memory comprising:
   a plurality of memory elements which stores data; and
   a third control device configured to access the plurality of memory elements in data unit of a fixed length, reads the data of a variable-length record, and sends to the second control device in response to the second request which targets the variable-length record.

7. The arithmetic processing device according to claim 1, wherein the second control device is configured to receive a first cyclic-redundancy check value based on the data in addition to the data corresponding to the first and second requests, create a second cyclic-redundancy check value based on the data corresponding to the first and second requests which are received, and determines that the data corresponding to the first and second requests which are received is effective when the second cyclic-redundancy check value matches with the first cyclic-redundancy check value.

8. The arithmetic processing device according to claim 1, wherein the second control device is configured to send identification information to connect the second request with the first request which is an origin of division in addition to the second request, receive the identification information with the data corresponding to the second request from the main memory, and identify the first request which is the origin of the division corresponding to the data which is received based on the identification information.

9. The arithmetic processing device according to claim 8, wherein the first control device is configured to specify an address of the cache memory which stores the data corresponding to the second request which is received, based on the original first request before the division which is specified.

10. An information processing device comprising:
a main memory; and
an arithmetic processing device which is connected to the main memory,
wherein the arithmetic processing device including:
a cache memory which stores data;
an arithmetic unit which performs an arithmetic operation for data stored in the cache memory;
a first control device which controls the cache memory part and outputs a first request which reads the data stored in the main memory; and
a second control device which is connected to the main memory and transmits a plurality of second requests which have been divided from the first request output from the first control device, receives data corresponding to the plurality of second requests which is transmitted from the main memory and sends each of the data to the first control device.

11. The information processing device according to claim 10, wherein the second control device is configured to create the plurality of second requests of which each reading target is an address range which has been divided from an address region of reading target of the first request.

12. The information processing device according to claim 10, wherein the second control device is configured to create the plurality of second requests and transmit the plurality of second requests to the main memory when the first request is based on a miss-hit of the cache memory which is controlled by the first control device, and to transmit the first request to the main memory when the first request is a request based on either one of a pre-fetch and a direct memory access.

13. The information processing device according to claim 10, wherein the second control device is configured to create the plurality of second requests based on the number of divisions for the first request to be set based on a size of processing unit of the arithmetic unit and a cache line size of the cache memory.

14. The information processing device according to claim 12, wherein the first control device is configured to receive the data from the main memory corresponding to the second request and store in the cache memory when the first request is a request based on the miss-hit of the cache memory and notify the arithmetic unit when the data corresponding to the second request is data in which the arithmetic unit targets for the operation.

15. The information processing device according to claim 10, wherein the main memory comprising:

a plurality of memory elements which stores data; and
a third control device configured to access the plurality of memory elements in data unit of a fixed length, reads the data of a variable-length record, and sends to the second control device in response to the second request which targets the variable-length record.

16. A control method of an arithmetic processing device which is connected to a main memory, has a cache memory which stores data, and an arithmetic unit which performs an arithmetic operation for data stored in the cache memory, the control method comprising;
outputting, by a first control device, a first request which reads data stored in the main memory;
transmitting, by a second control device which is connected to the main memory, a plurality of second requests which have been divided from the first request output from the first control device; and
receiving, by a second control device, data from the main memory corresponding to the plurality of second requests in which the first control device transmitted and sending each of the data to the first control device.

17. The control method according to claim 16, wherein the control method further comprising creating, by the second control device, the plurality of second requests of which each reading target is an address range which has been divided from an address region of reading target of the first request.

18. The control method according to claim 16, wherein the control method further comprising:
creating, by the second control device, the plurality of second requests and transmitting the plurality of second requests to the main memory when the first request is based on a miss-hit of the cache memory which is controlled by the first control device; and
transmitting, by the second control device, the first request to the main memory when the first request is a request based on either one of a pre-fetch and a direct memory access.

19. The control method according to claim 17, wherein the creating further comprising creating the plurality of second requests based on the number of divisions for the first request to be set based on a size of processing unit of the arithmetic unit and a cache line size of the cache memory.

20. The control method according to claim 16, wherein the control method further comprising:
accessing the plurality of memory elements in data unit of a fixed length and reading the data of a variable-length record in response to the second request which targets the variable-length record; and
sending the data to the second control device.

* * * * *